United States Patent [19]

Stannard

[11] Patent Number: 4,846,126

[45] Date of Patent: Jul. 11, 1989

[54] NATURAL GAS FUEL INJECTION

[75] Inventor: John Stannard, Kingston, Canada

[73] Assignee: Urban Transportation Development Corporation Ltd., Kingston, Canada

[21] Appl. No.: 134,958

[22] Filed: Dec. 18, 1987

[51] Int. Cl.$^4$ ............................................. F02B 31/00
[52] U.S. Cl. .................................... 123/308; 123/301; 123/294; 123/298; 123/27 GE
[58] Field of Search ............... 123/298, 294, 299, 308, 123/301, 27 GE, 65 VB

[56] References Cited

U.S. PATENT DOCUMENTS

| | | | |
|---|---|---|---|
| 1,260,408 | 3/1918 | Leissner | 123/298 |
| 1,595,148 | 8/1926 | Gardner | 123/254 |
| 1,605,000 | 11/1926 | Schneider | 123/65 VB |
| 1,620,124 | 3/1927 | Nielsen | 123/257 |
| 1,700,903 | 2/1929 | Marburg | 123/293 |
| 1,907,095 | 5/1933 | Adams | 123/293 |
| 1,939,180 | 12/1933 | Marburg | 123/293 |
| 2,256,776 | 9/1941 | Kammer | 123/256 |
| 2,304,979 | 12/1942 | Whitfield | 123/298 |
| 2,766,738 | 10/1956 | Hoffmann | 123/298 |
| 2,857,891 | 10/1958 | Hoffman et al. | 123/262 |
| 3,386,422 | 6/1968 | Eyzat | 123/262 |
| 3,658,046 | 4/1972 | Winkler | 123/307 |
| 3,963,001 | 6/1976 | Kruckenberg et al. | 123/291 |
| 4,091,774 | 5/1978 | Kamiya | 123/307 |
| 4,294,209 | 10/1981 | Eisele et al. | 123/293 |
| 4,444,166 | 4/1984 | Kovacs et al. | 123/262 |

OTHER PUBLICATIONS

Brandel and Ventura, "Problems in Adapting Ethanol Fuel to the Requirements of Diesel Engines," IV Int. Symp. on Alcohol Fuels Technology, Paper No. B.52, 10/5-8/80.
Friddell et al., "Conversion of the General Motors Series 71 Diesel Engine for Operation on Natural Gas," ASME.
Furuhama et al., "Hydrogen Cars with LH$_2$-tank, LH$_2$-Pump and Cold GH$_2$-Injection Two-stroke Engine," Musashi Institute of Technology, Tokyo, Japan, 37 pp.
Furuhama et al., "A LH$_2$ Engine Fuel System on Board Cold GH$_2$ Injection into Two-stroke Engine with LH$_2$-pump-", Musashi Institute of Technology, Tokyo, Japan, 37 pp.
Karim and Amoozegar, SAE Technical Paper Series 821222, "Examination of the Performance of a Dual Fuel Diesel Engine with Particular Reference to the Presence of Some Inert Diluents in the Engine Intake Charge," 10/18-21-82.
Wong et al., SAE Technical Paper Series 841001, "Conversion of a Two-Stroke Detroit Diesel Allison Model 12V-149T Diesel Engine to Burn Natural Gas with Pilot Injection of Diesel Fuel for Ignition," 8/6-9/84.
Ritter and Wood, "An Unthrottled Gaseious Fuel Conversion of a Gaseous 2-Stroke Diesel Engine," SAE Automotive Engineering Congress and Exposition, Detroit, MI, 2/24-28/75.
Stannard, "Preliminary Engineering Study of Natural Gas Injection Into Piston Engines," Transportation Technology Ltd., Report No. 553-990-001, Mar. 31, 1986.

Primary Examiner—E. Rollins Cross
Attorney, Agent, or Firm—Fleit, Jacobson, Cohn & Price

[57] ABSTRACT

An internal combustion engine is designed to run on natural gas and utilize the diesel cycle. To promote combustion, a mixing chamber is dispersed within a combustion chamber formed between the piston and cylinder. The chamber includes a pair of concentric housings, the innermost of which receives fuel from the injector and provides a rich mixture in the volume between the housings.

22 Claims, 2 Drawing Sheets

NATURAL GAS FUEL INJECTION

The present invention relates to internal combustion engines and more particularly to internal combustion engines that utilise a gaseous fuel such as natural gas.

The use of alternative fuels to gasoline and diesel oil has been investigated and to a certain extent implemented to utilise reserves of these alternative fuels. The use of natural gas has substantial promise as it is less expensive than conventional fuels, indigenous to North America with reserves that are greater than oil reserves and a distribution infrastructure that is already in place in North America. However, the use of natural gas in an induction engine, i.e. one in which the air-fuel mixture is throttled to control the operation of the engine, results in a low efficiency in certain applications which tends to negate the cost saving from the use of the natural gas fuel. For example, in internal combustion engines used in transit applications, there is a need to operate the engine at part-loads and idle for extended periods, which produces a relatively low efficiency for the induction engine. For this reason, engines operating on a diesel cycle which have an improved efficiency at part load and idle conditions have been used.

A comparison of the fuel properties of natural gas and diesel oil indicates that a natural gas engine operating on the diesel cycle should produce an improvement in efficiency compared with a conventional gasoline engine because of the higher compression ratios utilised. Two approaches to the use of natural gas in a diesel cycle have been suggested, namely the use of dual fuels, either with a port injection of the substitute fuel or dual injectors, or the use of a direct injection stratified charge of the natural gas fuel. This latter approach is preferred due to the expense of dual fuel systems but a problem exists in supplying the fuel so that it supports combustion whilst the overall fuel air ratios are well outside the normal combustion limits. In some engines the fuel has been sprayed onto the cylinder wall before top dead centre to permit considerable mixing before ignition occurs, whilst in others the operation is more like that of an assisted ignition diesel engine.

It is therefore an object of the present invention to provide an internal combustion engine in which the above problems are obviated or mitigated.

According, therefore, to the present invention there is provided an internal combustion engine comprising a cylinder, a piston moveable in said cylinder to vary the volume thereof, a fuel injector to inject fuel directly into said cylinder and an annular combustion chamber formed between said piston and cylinder, said combustion chamber including a mixing chamber disposed about said injector and having apertures to permit passage of gases between said mixing chamber and said combustion chamber.

Preferably, means are provided to induce swirl of the gases in the combustion engine and, in a preferred embodiment, the combustion chamber is formed in the piston with the injector and mixing chamber depending from an opposed wall of the cylinder.

An embodiment of the invention will now be described by way of example only with reference to the accompanying drawings in which FIG. 1 is a schematic representation of an internal combustion engine;

Figure 1:
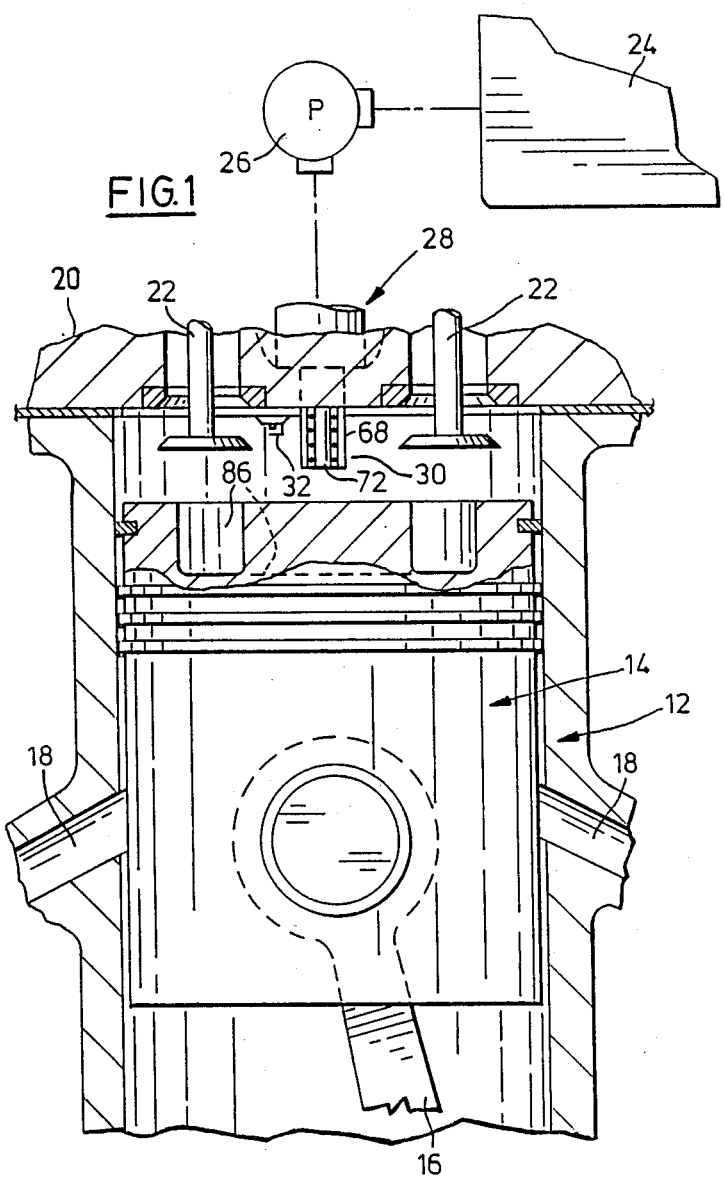

Referring therefore to FIG. 1, an internal combustion engine includes a cylinder 12 with a piston assembly 14 reciprocally mounted within the cylinder by a connecting rod 16 attached to a conventional crankshaft. The engine of FIG. 1 is a two-stroke engine and accordingly a pair of induction ports 18 are provided in the sidewall of cylinder 12 and connected to an air supply manifold in a conventional manner. Cylinder 12 includes an endwall 20, conventionally provided by a removable cylinder head, in which exhaust valves 22 are mounted to permit the expulsion of spent combustion gasses. Valves 22 are driven from a camshaft rotated in synchronism with the crankshaft in a conventional manner.

Figure 2:
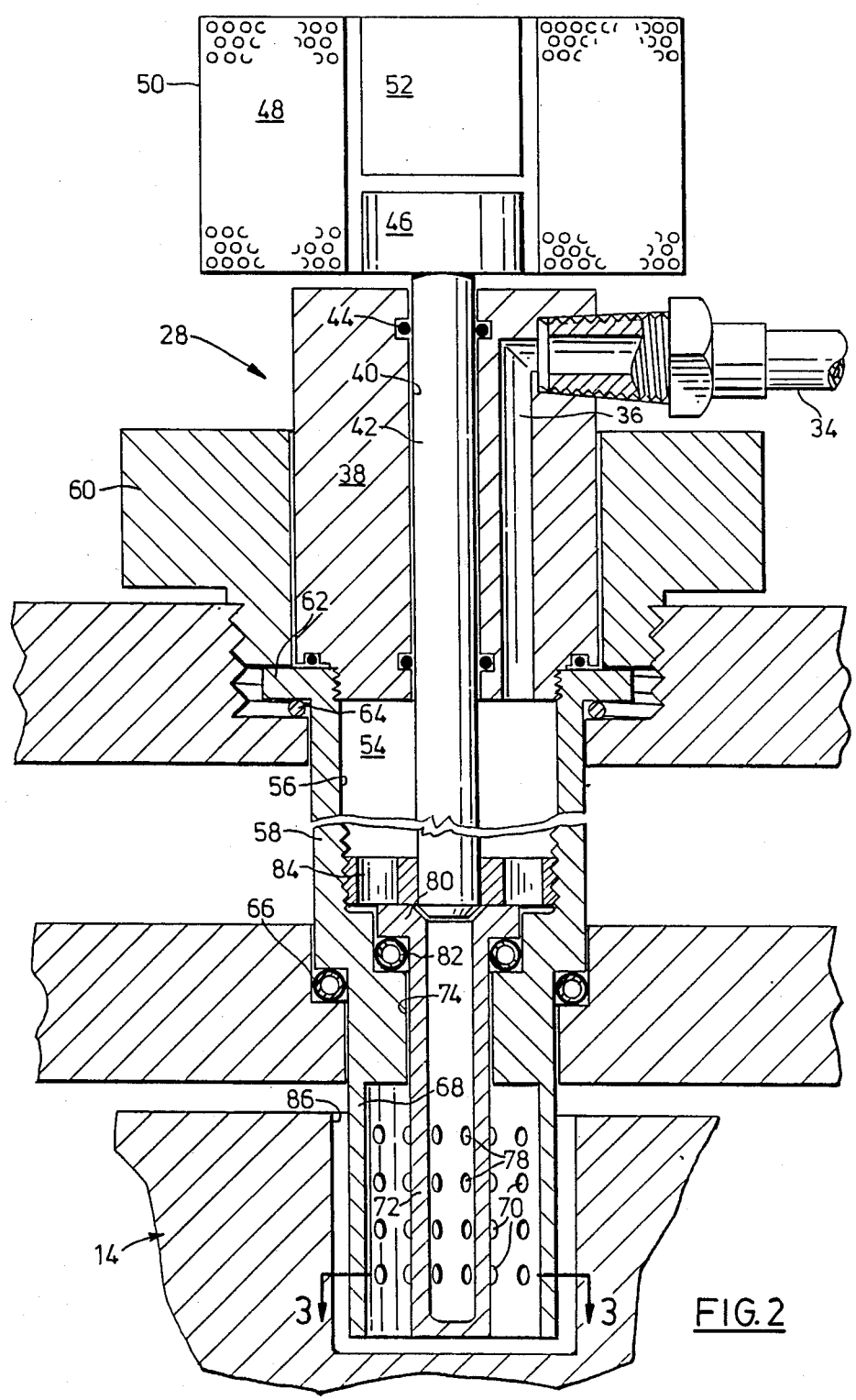
FIG. 2 is an enlarged view of a portion of FIG. 1.

Fuel is supplied to the cylinder 12 from a reservoir 24 of liquid natural gas through a pump 26 to an injector 28. The injector 28 supplies fuel to the interior of a mixing chamber 30 and ignition of the fuel is promoted by a spark plug 32. The details of the mixing chamber and piston assembly 14 can be seen in greater detail in FIG. 2.

Fuel from pump 26 is supplied through a pipe 34 to a passage 36 formed in the interior of the injector 28. Passage 36 is formed in a tubular body 38 that has a central bore 40 through which a valve member 42 passes. Valve member 42 is sealed by O-rings 44 at opposite ends of the passsage 40 and terminates in an enlarged head 46. Head 46 is surrounded by a solenoid 48, available under the trademark Colenoid from Lucas Industries Ltd. The solenoid 48 is provided with electrical power through a cable 50 connected to an appropriate control system. An abutment member 52 is mounted opposite the enlarged head 46 to limit movement of the valve member 42 under the influence of the solenoid 48.

The lower end of valve member 42 projects into a fuel holding chamber 54 defined between the end surface of the body 38 and a bore 56 formed in the upper end of a housing 58. Housing 58 is secured in a pair of aligned bores in the upper wall 20 of the cylinder 12 by a locking nut 60 that overlies a flange 62 formed at the upper end of bore 56. O-rings 64, 66 seal the housing 58 in the bores.

The lower end of housing 58 projects beyond the cylinder wall 20 and terminates in a part-cylindrical wall 68. Wall 68 forms the periphery of the mixing chamber 30 and has a number of circumferentially spaced apertures 70 distributed over its surface. The mixing chamber 30 also includes a cylindrical housing 72 that is received in a bore 74 formed in the housing 58. The cylindrical housing 72 is closed at one end by wall 76 and has a number of apertures 78 formed around the surface facing the wall 68. The upper end of housing 72 is formed with a shoulder 80 that seals against an O-ring 82 and is held in place by a nut 84 threaded into the interior of bore 56.

The inner periphery of the flange 80 is tapered to form a seat for the valve member 42 to control flow of fuel from the chamber 54 into the interior of the housing 72.

The mixing chamber 30 projects downwardly from the wall 20 into an annular groove 86 formed in the upper surface of piston 14. The spark plug 32 is also located in the endwall 20 to project into the groove 86 and is located immediately adjacent the cylindrical housing 72.

In operation, air is induced into the cylinder 12 through the induction ports 18 as they are uncovered by the piston 14. The placing of the induction ports 18 is such as to induce a swirl into the combustion gasses, which swirl is maintained as the piston 14 closes off the induction ports 18. Fuel is supplied from the pump 26 to the chamber 54 within the injector assembly 28 but is prevented from entering the cylinder by the valve member 42. As the piston 14 approaches the endwall 20, the mixing chamber 30 enters the groove 86 and the combustion gases are constrained to circulate within the groove by virtue of their swirl. The control unit sends an appropriate signal through the wire 50 to the solenoid 58 which causes a valve member 42 to be lifted from its seat and permit fuel to be injected into the interior of the cylindrical housing 72. The duration of the valve opening is controlled by the control unit to regulate the power and therefore rotational speed of the engine.

With the fuel in the interior of the cylindrical housing 72, it flows out of the aperture 78 into the zone between the wall 68 and the housing 72. In this region the fuel mixture is rich, permitting the natural gas to be ignited by the spark plug 32. The ignited gases propagate through the annular channel 86 due to the swirl of the combustion gases which induces thorough mixing and complete burning of the fuel. The piston is of course thus forced downward through the cylinder and the spent combustion products expelled at the appropriate time through the exhaust valves 22 and a fresh charge induced in through the inlet ports 18.

Figure 3:
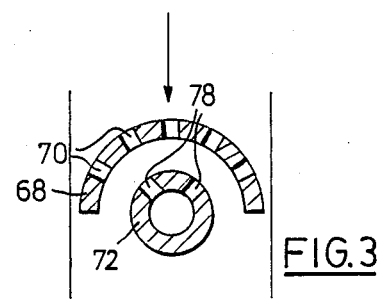
FIG. 3 is a section on the line 3—3 of FIG. 2.

It will be noted from FIG. 3 that the wall 68 is positioned upstream of the cylindrical housing 72 and extends across the channel 86. The apertures 78 face upstream to promote a good initial mixing of the fuel with the air in the zone between the walls 68 and cylindrical housings 72.

The exact orientation of the apertures and dimensions of the housings 72 and walls 68 will depend upon the particular application and engine used. However, for a Detroit diesel Allison 6V-53, it is anticipated that the channel 86 will have a width of 15 mm and a depth of 17 mm. A nominal gap of 1 mm will be provided between the wall 68 and the side of the groove 86. The valve lift and opening period may be adjusted to suit the particular fuel requirements and power outputs of the engine but for the example given it above it has been calculated that approximately 77.2 mm$^3$ of natural gas has to be injected at maximum speed and zero power output, which fuel can be injected in a short pulse in the order of 0.6 millisecond duration. For the minimum speed operation, a valve opening time in the order of 0.3 millisecond can be utilised.

An alternative control strategy would be to reduce the supply pressure of the fuel and maintain the opening time constant.

I claim:

1. An internal combustion engine comprising a cylinder, a piston moveable in said cylinder to vary the volume thereof, a fuel injector to inject fuel directly into said cylinder, an annular combustion chamber formed between said piston and cylinder, and means to induce swirl of gases in said annular combustion chamber, said annular combustion chamber having a mixing device disposed therein, said device being offset from the axis of said cylinder and disposed upstream of said injector with reference to the direction of swirl, said device having apertures to permit passage of gases through said mixing device and along said combustion chamber.

2. An internal combustion engine according to claim 1 wherein said combustion chamber is formed in said piston and said injector and mixing device depend from said cylinder.

3. An internal combustion engine according to claim 1, wherein said mixing device includes a first housing to receive fuel injected by said injector and a second housing spaced upstream with reference to the direction of swirl from said first housing, each of said housings having apertures therein to provide communication with said combustion chamber.

4. An internal combustion engine according to claim 3 wherein said second housing extends partially about said first housing.

5. An internal combustion engine according to claim 4 wherein said apertures in said first housing are directed toward said second housing.

6. An internal combustion engine according to claim 5 wherein said first housing is tubular and is connected at one end to said injector.

7. An internal combustion engine according to claim 6 wherein the end of said housing opposite said injector is closed and said apertures are formed in the tubular wall of said housing.

8. An internal combustion engine according to claim 7 wherein said second housing is part tubular and concentric with said first housing.

9. An internal combustion engine according to claim 8 wherein said combustion chamber is formed in said piston and said injector and mixing device depend from said cylinder.

10. An internal combustion engine according to claim 3 wherein an igniter is disposed in said combustion chamber.

11. An internal combustion engine according to claim 10 wherein said igniter is disposed adjacent to and downstream of said mixing device.

12. An internal combustion engine comprising a cylinder, a piston moveable in said cylinder to vary the volume thereof, a fuel injector to inject fuel directly into said cylinder, and an annular combustion chamber formed between said piston and cylinder, said combustion chamber including a mixing chamber disposed about said injector and having apertures to permit passage of gases between said mixing chamber and combustion chamber, means to induce swirl of gases in said combustion chamber, and said mixing chamber including a first housing to receive fuel injected by said injector and a second housing spaced from said first housing, each of said housings having apertures therein to provide communication with said combustion chamber.

13. An internal combustion engine according to claim 12 wherein said second housing extends partially about said first housing.

14. An internal combustion engine according to claim 13, wherein said apertures in said first housing are directed toward said second housing.

15. An internal combustion engine according to claim 14, wherein said first housing is tubular and is connected at one end to said injector.

16. An internal combustion engine according to claim 15, wherein the end of said housing opposite said injector is closed and said apertures are formed in the tubular wall of said housing.

17. An internal combustion engine according to claim 16, wherein said second housing is part tubular and concentric with said first housing.

18. An internal combustion engine according to claim 17, wherein said second housing is upstream of said first housing with respect to the direction of rotation of gases in said cylinder.

19. An internal combustion engine according to claim 18, wherein said apertures in said first and second housing are directed upstream.

20. An internal combustion engine according to claim 19, wherein said combustion chamber is formed in said piston and said injector and mixing chamber depend from said cylinder.

21. An internal combustion engine according to claim 12, wherein an igniter is disposed in said combustion chamber.

22. An internal combustion engine according to claim 21, wherein said igniter is disposed adjacent to and downstream of said mixing chamber.

* * * * *